July 12, 1927.
A. CAMPBELL
DUMP CAR
Original Filed Nov. 8, 1922
1,635,248
3 Sheets-Sheet 2
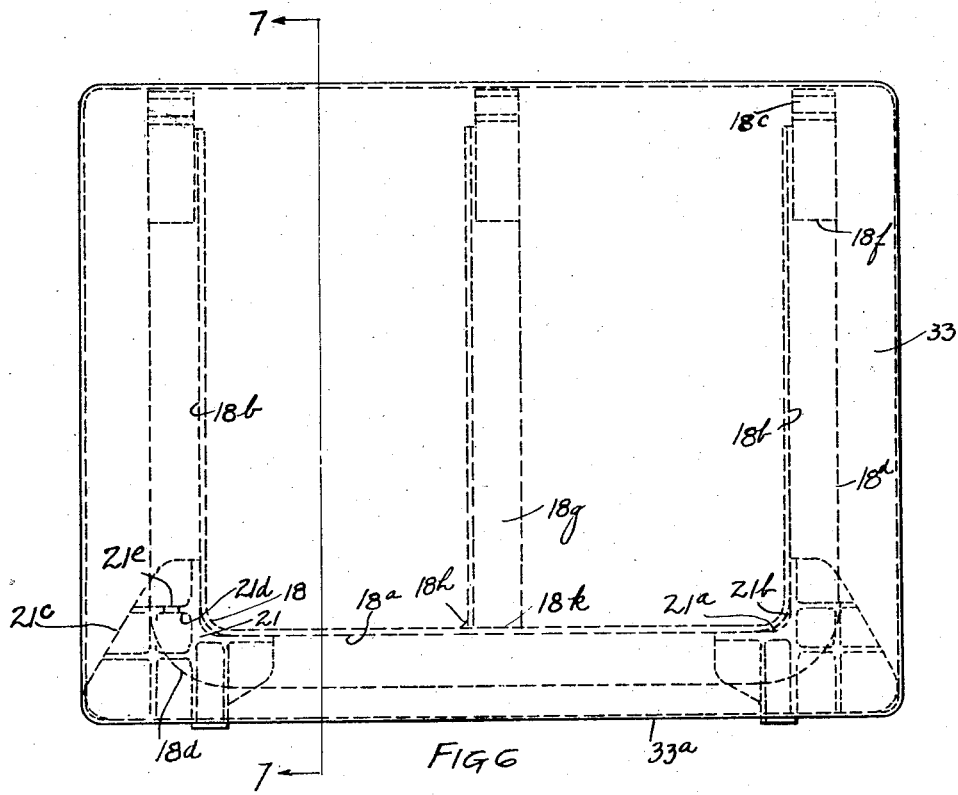
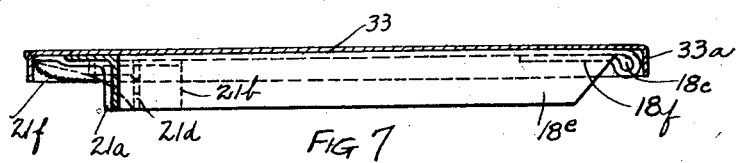
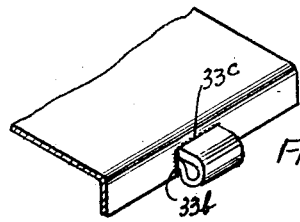
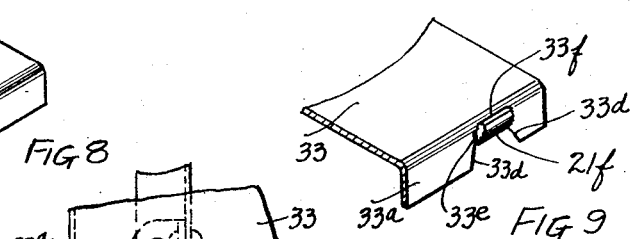
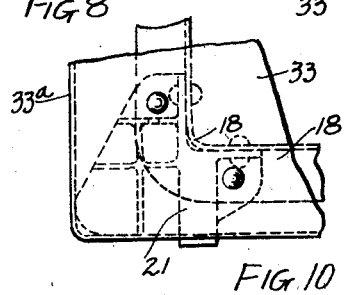
Inventor
ARGYLE CAMPBELL
BY
George T. Haight
HIS ATTORNEY
WITNESSES

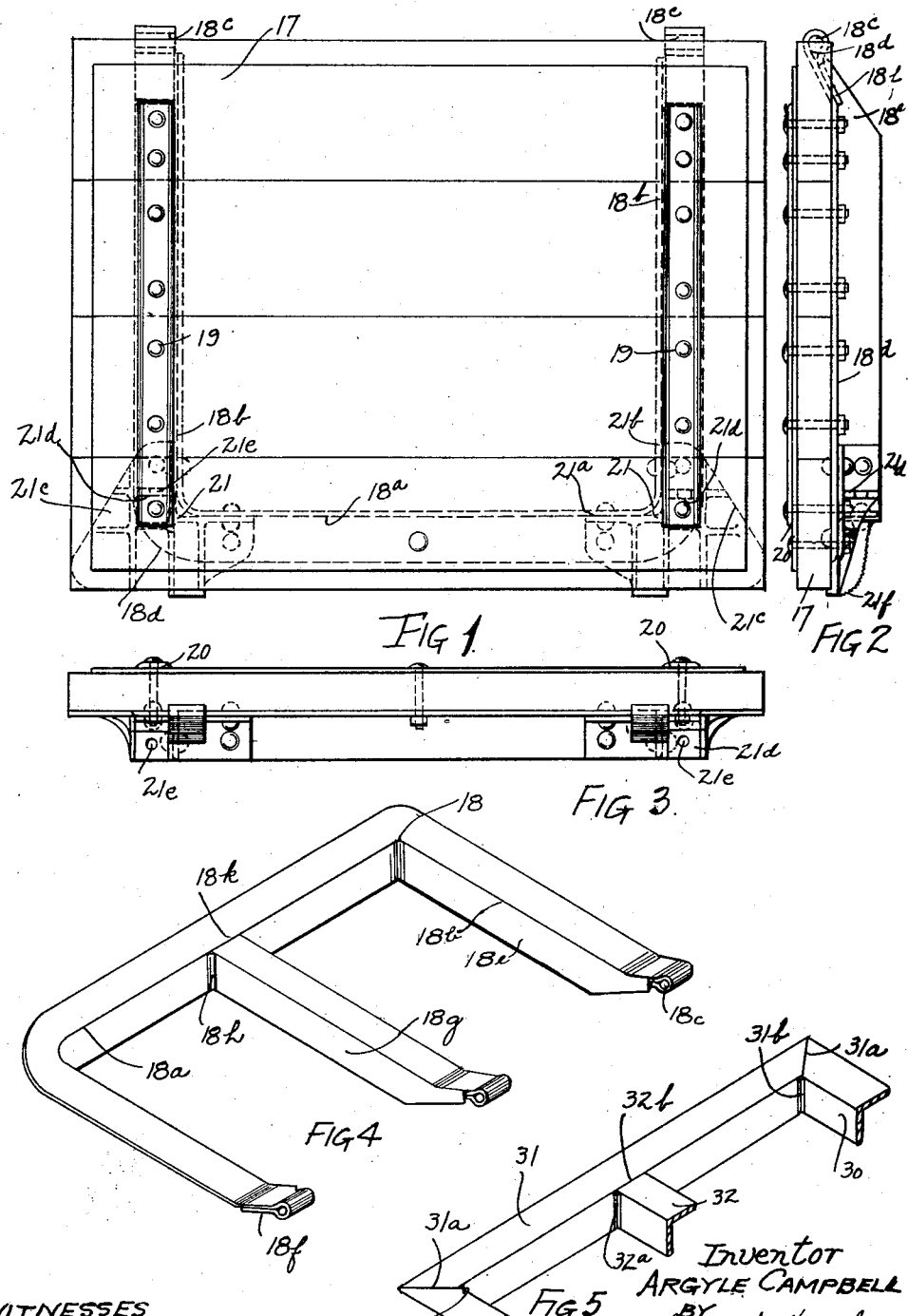

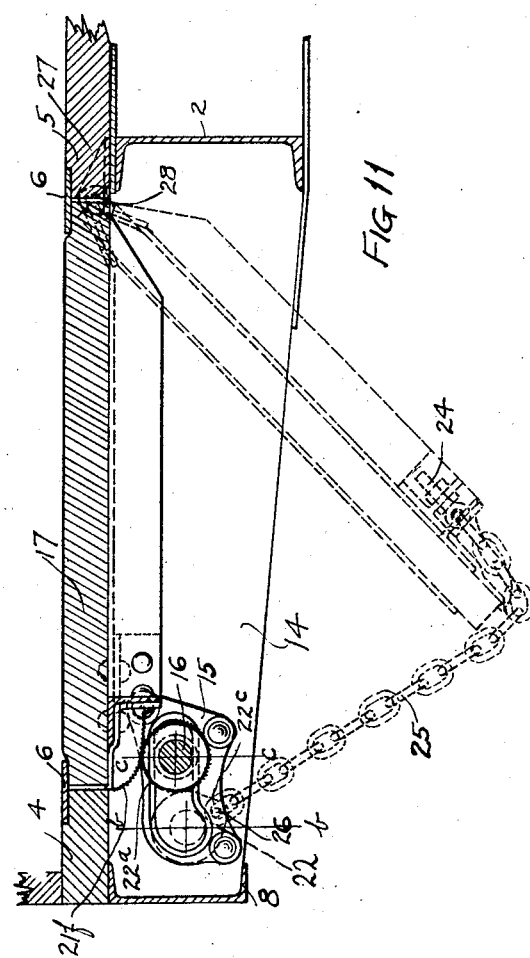

Patented July 12, 1927.

1,635,248

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP CAR.

Original application filed November 8, 1922, Serial No. 599,632, now Patent No. 1,515,833, dated November 18, 1924. Divided and this application filed September 10, 1923. Serial No. 661,752.

This invention relates to improvements in dump cars, and more particularly to the general service type provided with a flat bottom and adapted to carry bulk material, such as coal which may be unloaded by shoveling or dumping through dump openings in the floor of the car.

This application is a division of my application, Serial No. 599,632 for dump cars, filed November 8, 1922, which resulted in Patent No. 1,515,833 dated November 18, 1924.

One object of this invention is to provide a door construction particularly adapted for dump cars, wherein the door is provided with a supporting brace which will effectively prevent the door from buckling.

Another object of this invention is to greatly lighten the weight of dump doors by substituting welding for the cumbersome and insecure connections hitherto used.

A further object of this invention is to provide an improved bracket on the door which will operate to brace the door longitudinally and transversely and provide a rigid abutment for supporting the door in closed position.

In the drawings forming a part of this specification, Figure 1 is a top plan view of one of the improved doors, the door being shown detached from the car. Figure 2 is an end elevational view of the door shown in Figure 1. Figure 3 is a front edge elevational view of the door shown in Figure 1. Figure 4 is a detailed perspective view of a modified form of reinforcing combined brace and hinge member used in connection with the door shown in Figures 1, 2 and 3. Figure 5 is a detailed perspective view, partly broken away, similar to Figure 4, showing a further modification of the combined brace and hinge member. Figure 6 is a view similar to Figure 1, showing a different embodiment of the invention. Figure 7 is a transverse, vertical, sectional view corresponding substantially to the line 7—7 of Figure 6. Figure 8 is a detailed perspective view, partly broken away, showing a modified construction of the metallic door illustrated in Figure 6 with the hinge extended through the flange. Figure 9 is a detailed perspective view, partly broken away, of the free end of the door shown in Figures 6 and 7, illustrating a construction of the serrated abutment extending through the door flange. Figure 10 is a fragmentary view of the door shown in Figure 6, illustrating a further modification, showing a riveted connection between the door members which may be substituted for the welded connection or be supplementary thereto. And Figure 11 is a vertical, transverse, sectional view of approximately one-half of a dump car, illustrating my improved door construction in connection therewith as shown in Figure 1, the section corresponding substantially to a line extending centrally through the door.

In said drawings, I have illustrated my improvements as embodied in a dump car of the general service type having a trussed side frame. Referring first to the embodiment of the invention illustrated in Figures 1, 2, 3, and 11, I have shown the car as having center sills 2, a floor having discharge openings therein and having floor portions adjacent thereto as at 4 and 5 with protection plates therefor as at 6 and lower side sill members 8. The side sills are connected to the center sills by means of cross bearers 14 which are slotted at the outer ends thereof and have slotted brackets 15 secured thereto through which an operating shaft 16 passes and is adapted for translatory movement therein as shown in Figure 11, moving from a position adjacent the free edge of the door, designated as $b$—$b$ to a position under the same, designated as $c$—$c$. In dump cars of the identified construction, a difficulty hitherto experienced has been found in the door buckling under load as corrosion of the door takes place, thereby wedging the shaft outwardly and forcing it from under the door and also causing the shaft to twist and rendering subsequent operations of the door mechanism difficult and unreliable.

The improved door construction disclosed in this application overcomes this objection, when used with a mechanism of the character referred to, inasmuch as I have constructed a door of great strength and rigidity and one wherein a continuous reinforcement is provided. Referring to Figures 1, 2, and 3, it will be seen that I have provided a door composed of boards 17 and a one-piece supporting brace therefor composed of a member 18, preferably an angle formed in the shape of a U with a transverse portion 18ª extending parallel with the front edge of the door and uniting longitudinal beam portions 18ᵇ. Longitudinal beam portions 18ᵇ are provided with hinge eyes 18ᶜ preferably formed by extending the horizontal flange 18ᵈ beyond the vertical flange 18ᵉ and bending it over itself as at 18ᶠ where the overlapping portions are united by welding. The boards 17 are secured by means of bolts 19 to the brace and beveled washer plates 20 bind the boards together and prevent the bolts from sinking in the wood when the nuts are tightened. These washer plates are beveled in the manner shown and, used in conjunction with button head shaped bolts, provide for a minimum obstruction to shoveling, inasmuch as the transition from the level of the door floor to the level of the washer plate is gradual.

The door is provided near each outer corner thereof with a bracket member 21 having angularly disposed flanges 21ª and 21ᵇ respectively secured either by welding or riveting to transverse beam portion 18ª and longitudinal beam portion 18ᵇ. The said flanges are connected by a laterally extending flange portion 21ᶜ secured to the horizontal flange 18ᵈ of the brace. The brackets 21 are each provided with a projecting nose having serrated face 21ᶠ adapted to be engaged by serrated roller face 22ª formed integral with the door raising chain guide 22 which is rigidly mounted on shaft 16. The brackets 21 are each provided with a projecting wing 21ᵈ perforated at 21ᵉ to receive chain eye bolt 24 to which the door chain 25 is secured. This point of attachment between the door and chain is preferably located on the exterior of the door supporting framework thereby obviating the necessity of cutting out the door reinforcement to permit the chain to pass therethrough as has heretofore frequently been the case.

The opposite end of each chain 25 is secured to a chain guide 22 by means of pin 26 passing through flanges 22ᶜ. As shown in Figure 11 in dotted lines, the door is entirely supported in the open position by means of the chains which are made of adequate strength for this purpose. In cars of the general service type, the doors are pivotally mounted on hinge brackets 27 by means of hinge pins 28 which are preferably mounted on the center sill or adjacent thereto.

The door as shown in Figures 1 to 3 is the usual construction employed for small doors being formed with two hinges but in larger doors I prefer to employ an additional hinge disposed intermediately of the usual hinges. This construction is clearly illustrated in Figure 4 wherein the additional beam member is designated by the character 18ᵍ and is secured to the transverse beam portion 18ª by welding as at 18ʰ and 18ᵏ. The embodiment of the additional beam member referred to is of great importance in cars of the type described and wherein is employed an operating mechanism of the character indicated, inasmuch as the doors are thereby practically prevented from warping or distortion, thus assuring that the entire length of the free edge of the door will be in proper position to engage over the shaft when the latter is rolled under the door, this holding true for all of the doors in the series.

A modified construction of door brace is shown in Figure 5 wherein the outer longitudinal beam portions 30 and transverse beam portion 31 are formed of separate pieces and united preferably by a mitered joint by welding as at 31ª and 31ᵇ. The additional longitudinal member 32 is also secured to the transverse beam by welding as at 32ª and 32ᵇ.

In Figure 6 I have illustrated my improved door bracing as applied to an all steel door. The door plate 33 is preferably formed with flanges 33ª at its outer edges providing for stiffness in the plate and guarding against buckling at the edges. The characters for the door bracing applying to Figures 1 to 4 will also apply to this construction inasmuch as the same construction is used. In the case of the steel door, I prefer to make the entire door by welding the parts together forming a perfectly level and unobstructed door of great advantage for shoveling and in this particular instance the preferred procedure is to weld a non-corrosive plate to the brace formed of ordinary open hearth mild steel angles. In the welding of the door plate to the brace I prefer to accomplish this result by the spot welding process and in order to successfully accomplish this result it is necessary that the members to be so united be free from rust and corrosion and while it is a comparatively easy matter to store large quantities of angles or similar sections and effectively guard the same against rust this fact does not apply to large plates. By reason of their flexibility pockets form in the plates while in storage and moisture accumulates therein resulting in corrosion and rendering such plates useless for the purpose of this invention. I have discovered that plates having a percentage of copper and commercially known as "copper bearing plates" may always be relied upon to form a good weld and furthermore such doors when in service do not deteriorate as rapidly as ordinary commercial steel. While I have shown the door in Figure 6 as entirely united by welding including the bracket member 21 to the door plate, I can conceive that in some cases a riveted connection might be substituted therefor as shown in Figure 10 or rivets might be used as supplementary to the weld. This condition would also be applicable to the construction illustrated in Figure 5.

In some cases it is necessary to extend the hinge eye as shown in Figure 8 beyond the edge of the door and when such is the case it means cutting out the flange of the door thereby weakening the same. In this invention I have offset this weakness by welding the door plate edge to the side and top of the hinge as shown at 33$^b$ and 33$^c$ respectively thereby forming a unitary structure of the hinge and door flange. In like manner the projecting end of the nose 21$^f$ is welded at the sides and top thereof to the door plate as shown at 33$^e$ and 33$^f$. The door flange to each side of the nose is cut away as at 33$^d$ to form a flared channel way to guide the roller face 22$^a$ therein and thereby compensate for any undue side play in the door.

The free edges of the doors are raised by rotation of the shaft 16 causing the chain 25 to wind on the guide 22 in the spiral guideways provided for this purpose.

I have herein shown and described what I now consider the preferred manner of carrying out my invention, but the same is merely illustrative and I contemplate all changes and modifications that come within the scope of the claims appended hereto.

I claim:

1. In a hinged dump door for railway cars, reinforcing means therefor comprising a continuous angle shaped member having the sections thereof disposed respectively parallel and at right angles to the plane of the door, said member forming a beam extending transversely of the door near the free edge thereof and being bent to form longitudinally extending members having hinges at their outer ends; said hinge being formed by extending the flange of the angle which is parallel to the plane of the door beyond the other flange and bending it over itself and welding the joint.

2. In a hinged dump door for railway cars, the combination with the floor thereof, of a reinforcing brace therefor comprising an angle shaped member having one flange thereof disposed at an angle to the plane of the door and with the other flange lying flat against the door, said last-named flange being extended beyond the other and being bent to form a hinge eye and then extended upon itself and welded.

3. In a hinged dump door for railway cars, reinforcing means therefor comprising a member having longitudinal beam portions extending from the hinges of the said door towards the free edge thereof and a transverse beam portion uniting the said longitudinal members and a supplementary longitudinally disposed beam member disposed intermediately of the aforesaid longitudinal members and welded to the transverse beam member.

4. In a hinged dump door for railway cars, reinforcing means therefor comprising a member having longitudinal beam portions extended to form hinges for the door and having a beam portion extending transversely of the door near the free edge thereof and uniting the said longitudinal beam portions and a supplementary hinge member having the end thereof welded to the said transverse member.

5. In a hinged dump door for railway cars, reinforcing means therefor comprising a member having beam portions extending longitudinally of the door and having a beam portion extending transversely of the door and uniting the said longitudinal beams, and a strengthening bracket at each junction of said transverse and longitudinal beams, each of said brackets being secured to both the said transverse beam and the corresponding longitudinal beam.

6. In a dump door for railway cars, in combination a flanged metallic door plate having openings formed in the flanges, load carrying members extending through such openings and adapted to be welded to the said flange.

7. As an article of manufacture, a brace for a load-supporting door adapted to be secured to the under side thereof, said brace comprising a one piece rigid member, including spaced sections arranged to extend longitudinally of the door and an intermediate connection section adapted to extend across the door, adjacent an edge thereof, said sections all being of angular cross section, with the respective flanges thereof disposed so as to lie flat against the door, and at an angle thereto, the flanges which are adapted to lie flat against the door being provided with integral hinge members at the free ends thereof in such position as to be braced by the flanges lying at an angle to said door.

8. As an article of manufacture a dump door for railway cars, composed of a metallic door plate having a smooth, unobstructed upper surface, and a supporting brace in the form of angular members disposed beneath said door, one flange of said brace lying flat against the under side of said door plate, and the other flange extending at an angle to the underside of said door plate, said brace being rigidly united with the under surface of said door plate, in such manner as to confine the brace and the securing means entirely to the under surface of said door plate.

In witness that I claim the foregoing I have hereunto subscribed my name this 29th day of August, 1923.

ARGYLE CAMPBELL.